(12) United States Patent
Carpenter

(10) Patent No.: US 7,137,602 B2
(45) Date of Patent: Nov. 21, 2006

(54) METHOD AND APPARATUS FOR SUPPORTING AN ARTICLE

(76) Inventor: Gary Carpenter, 1744 Auburn Dr., Carrollton, TX (US) 75007

( * ) Notice: Subject to any disclaimer, the term of this patent is extended or adjusted under 35 U.S.C. 154(b) by 0 days.

(21) Appl. No.: 10/973,216

(22) Filed: Oct. 22, 2004

(65) Prior Publication Data
US 2005/0178932 A1 Aug. 18, 2005

(51) Int. Cl.
*A63B 55/00* (2006.01)
(52) U.S. Cl. ......................... 248/96; 211/85.7
(58) Field of Classification Search ............... 248/95, 248/96; 220/404; 280/646; 180/651; 206/315.7, 206/315.3; 224/42.33, 274, 571, 901; 211/85.1
See application file for complete search history.

(56) References Cited

U.S. PATENT DOCUMENTS 2,007,709 A 7/1935 Eppens
5,333,829 A 8/1994 Bell et al.
5,491,855 A 2/1996 Charles
5,575,295 A 11/1996 Khalsa et al.
5,875,943 A 3/1999 Frandsen, Sr.
6,435,617 B1 8/2002 McNair
6,443,405 B1 * 9/2002 Han ........................... 248/96
6,494,320 B1 12/2002 Schmidt et al.
6,591,994 B1 7/2003 Bearss
6,644,604 B1 * 11/2003 Young ........................ 248/96

* cited by examiner

*Primary Examiner*—Ramon O Ramirez
(74) *Attorney, Agent, or Firm*—Schultz & Associates, P.C.

(57) ABSTRACT

A method and apparatus for the support of an article provided as a single article of manufacture adapted to rest in the trunk or cargo area of a vehicle or any other flat surface. The single article of manufacture is able to be separated into at least two pieces that interlock to form the support that cradles the article at an angle such that the base of the article maintains contact with the floor of the vehicle while the top of the article is held in an upright position.

13 Claims, 8 Drawing Sheets

Base Support

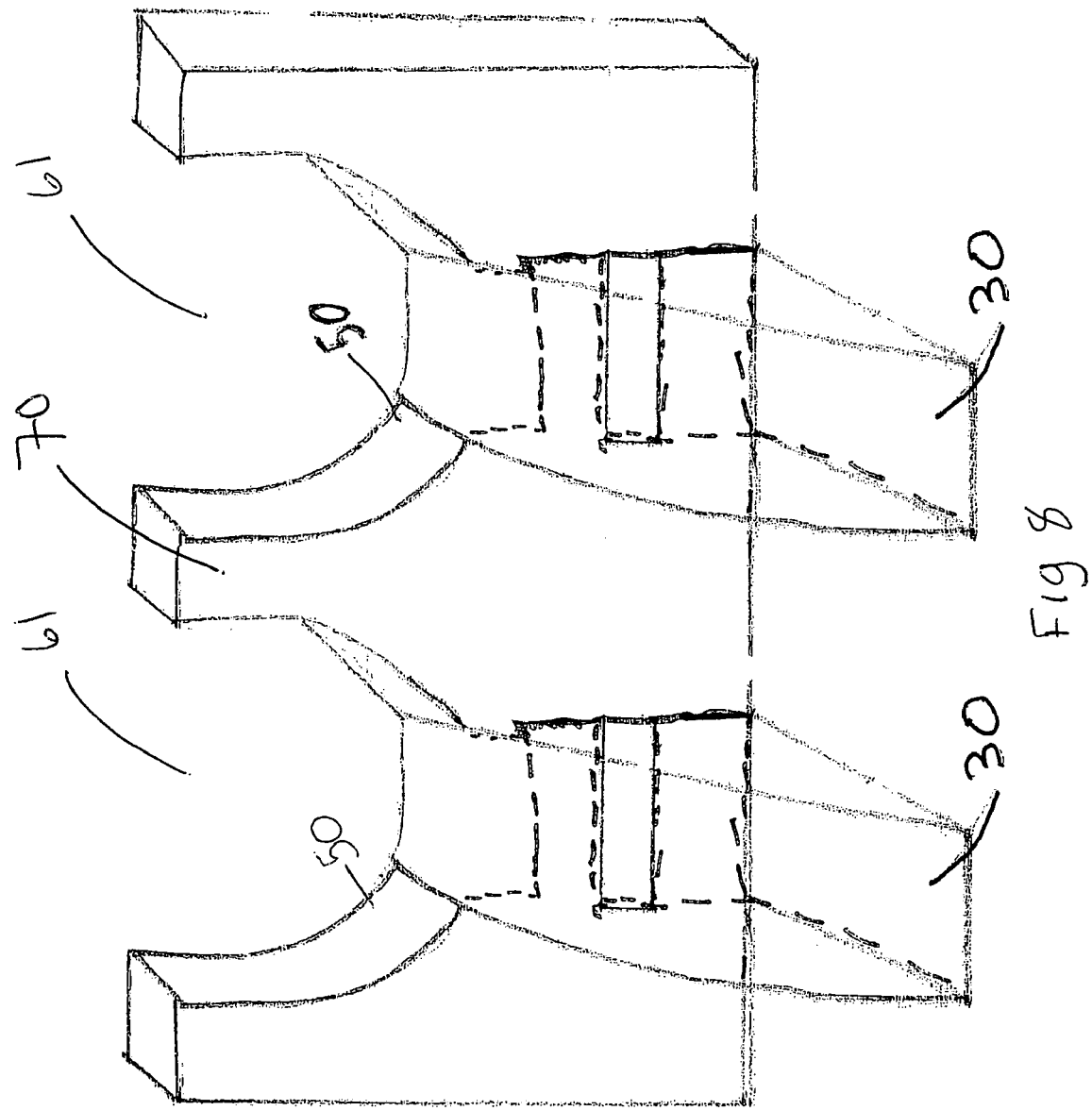

METHOD AND APPARATUS FOR SUPPORTING AN ARTICLE

FIELD OF THE INVENTION

This invention relates generally to a transport method and means for holding an item that is to be moved from one location to another while maintaining the item in an inclined position to keep the article substantially secure. In particular, the invention is a method and apparatus to hold a golf bag in an inclined position in the trunk or cargo area of a vehicle to keep the contents of the golf bag from shifting during transport. The apparatus may be disassembled into two components that fit together to form a single, compact article for ease of storage.

DESCRIPTION OF PRIOR ART

There are several effective devices for transporting golf bags in an inclined position to maintain the position of the contents of the golf bag. There are devices that allow a golf bag to be stored in a vehicle in a substantially upright position. However, these devices are not comprised of two interlocking pieces that can be manufactured from a single, uniform sized piece of material and stored in a compact shape. There are other prior art devices that attach to the golf bag and unfold to allow the bag to maintain an upright position. However, these devices are also not capable of being manufactured from a single, uniform sized piece of material or stored in a single compact shape. These devices must also be fitted and attached to a particular golf bag rendering them only capable of use with a particular bag.

It is apparent that when a golf bag is to be transported from one location to another, it is desirable to maintain the item in an inclined position to maintain the contents of the bag. The optimal angle for storing a bag to maintain its contents is 90 degrees between the length of the bag and the floor or bed of the transport vehicle. Due to the size of the golf bag and the often the lack of space within a vehicle, it is often impossible to store a golf bag in such a position. However, to prevent articles from sliding or rolling out of the bag, it is usually sufficient to maintain a slight incline between the and the floor or bed of the transport vehicle. There is often enough space to accommodate this configuration by utilizing the trunk or bed of the transport vehicle. It is also apparent that when the device is not in use it is desirable to have a compact design such that the device takes up as little space as possible. It is also desirable to have an easy form of manufacture to cut down on cost associated with production and packaging. This apparatus is manufactured from a single piece of material that can be easily made and packaged.

A need, therefore, exists for an improved and compact method and apparatus for transporting a golf bag and storing the apparatus when it is not in use.

It is, therefore, objective of the present invention to provide an inexpensive and compact golf bag holder that maintains the bag at an angle sufficient to prevent escape of the contents during transport or storage. It is further an objective of the present invention to provide a compact means of supporting a golf bag which can be disassembled and reassembled to form a compact shape that is easily stored when not in use.

SUMMARY OF THE INVENTION

The present invention can be formed from a single piece of firm yet resilient material such as polypropylene or polyethylene foam having a polygonal shape that can be separated into at least two pieces that interlock to form the support. The polygonal or rectangular piece of material is easily stored in a compact location, e.g., under a seat in a vehicle. The preferred embodiment of this invention has dimensions of 12 to 24 inches long by 8 inches wide by 2 inches thick in its storage configuration.

When the apparatus is ready to be used to support a golf bag or other article, it is separated into at least two separate pieces that interlock to form the support. The separate pieces comprise a body and at least one arch support. The arch support(s) fits into an arcuate depression(s) in the body during storage. During use, the body of the support interlocks at an approximate 90 degree angle with the arch support(s). Interlocking extensions on the arch support(s) engage the indention in the body. The body of the support has a substantially flat bottom to allow for stability while in use. The arcuate depression(s) in the body accepts the side of a golf bag and holds it above the floor of a vehicle.

In one preferred embodiment the depression(s) has dimensions in excess of the golf bag to allow the article to make contact with the bottom of the depression and remain contained by the sides of the depression(s).

In another embodiment the depression is angular allowing the golf bag to fit snugly.

In one preferred embodiment, a logo or emblem is affixed onto the support for the purpose of advertising or to personalize the apparatus.

These and other objects, features and advantages of the present invention will be more readily apparent when considered in connection with the following, detailed description of preferred embodiments of my invention, which description is presented in conjunction with annexed drawings, in which:

BRIEF DESCRIPTION OF THE DRAWINGS

FIG. 8 is a perspective view of an alternate embodiment of the assembled configuration of the invention.

DETAILED DESCRIPTION OF PREFERRED EMBODIMENTS

Figure 1:
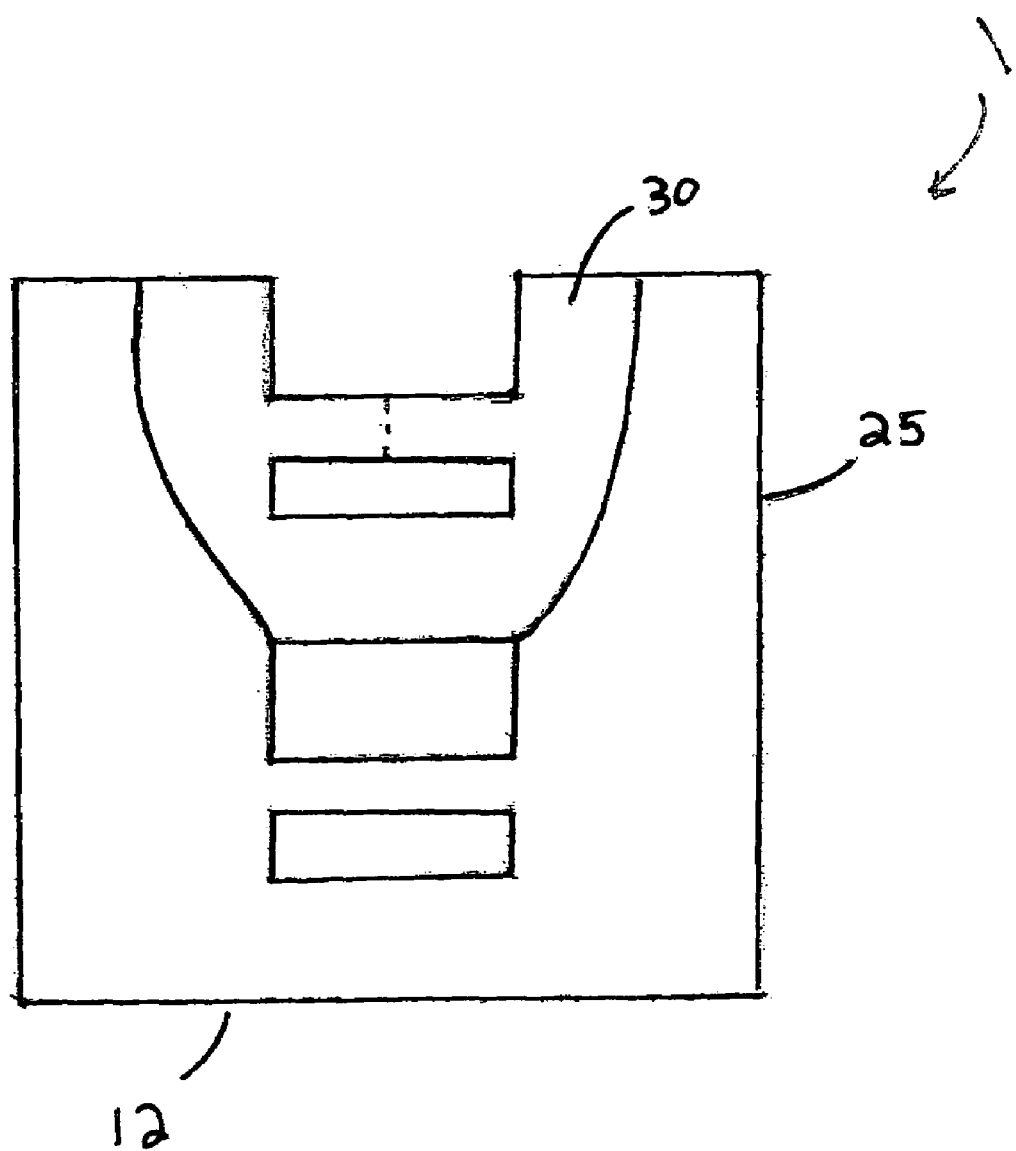
FIG. 1 is a plan view of the invention in its transport configuration.

Referring to FIG. 1, support apparatus 1 is shown as it appears when assembled in a storage configuration. The preferred embodiment of the invention is comprised of two separate pieces which fit together to form a compact uniform shape. In the preferred embodiment, the compact uniform shape is a rectangle but, of course, can be other shapes. The two pieces of the preferred embodiment are body support 25 and arch support 30.

Figure 2:
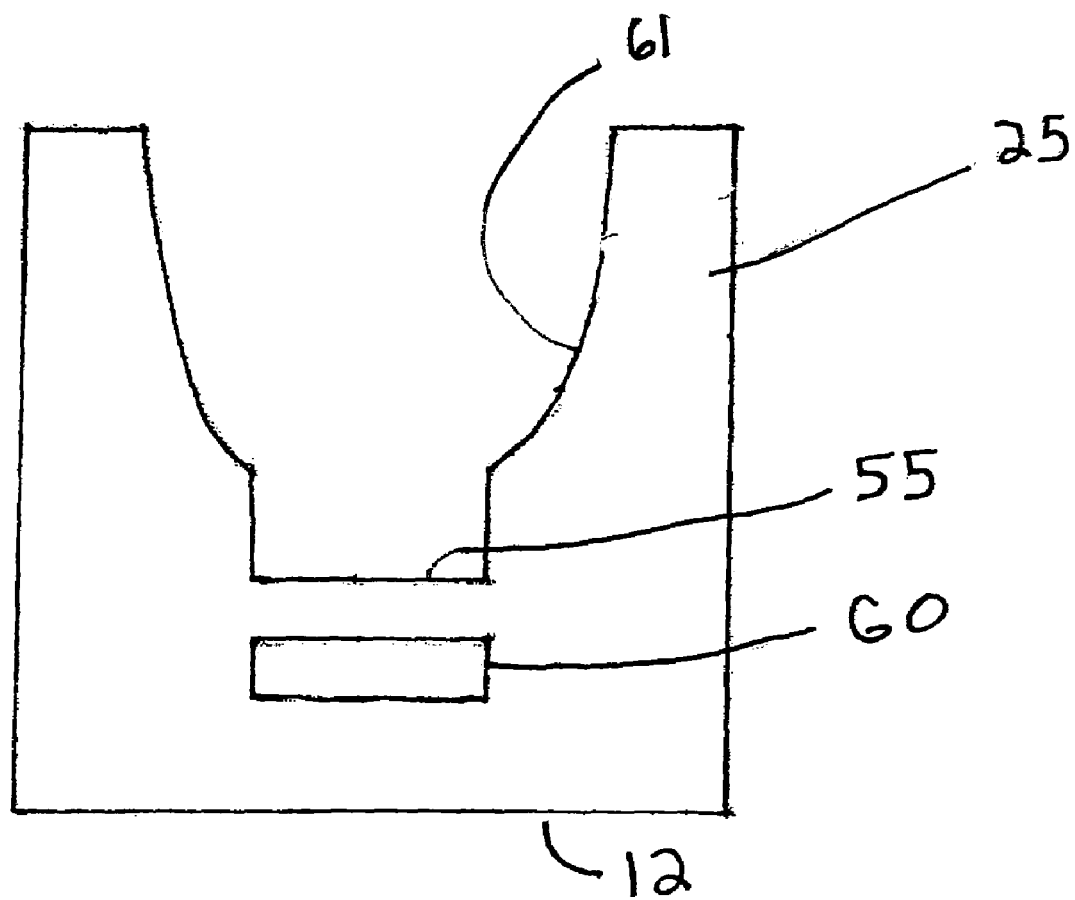
FIG. 2 is a plan view of the body support.

FIG. 2 shows body support 25. FIG. 2 shows the location of indentions 55, 60 and depression 61. The depression 61 should be wide enough to allow the article to make contact with the bottom of the depression 61 to allow for maximum support and containment. Depression 61 is formed with indention 55 which in the preferred embodiment is the same width as support arch 30. Base surface 12 is generally flat to allow for support of articles when support apparatus 1 is in use.

Figure 3:
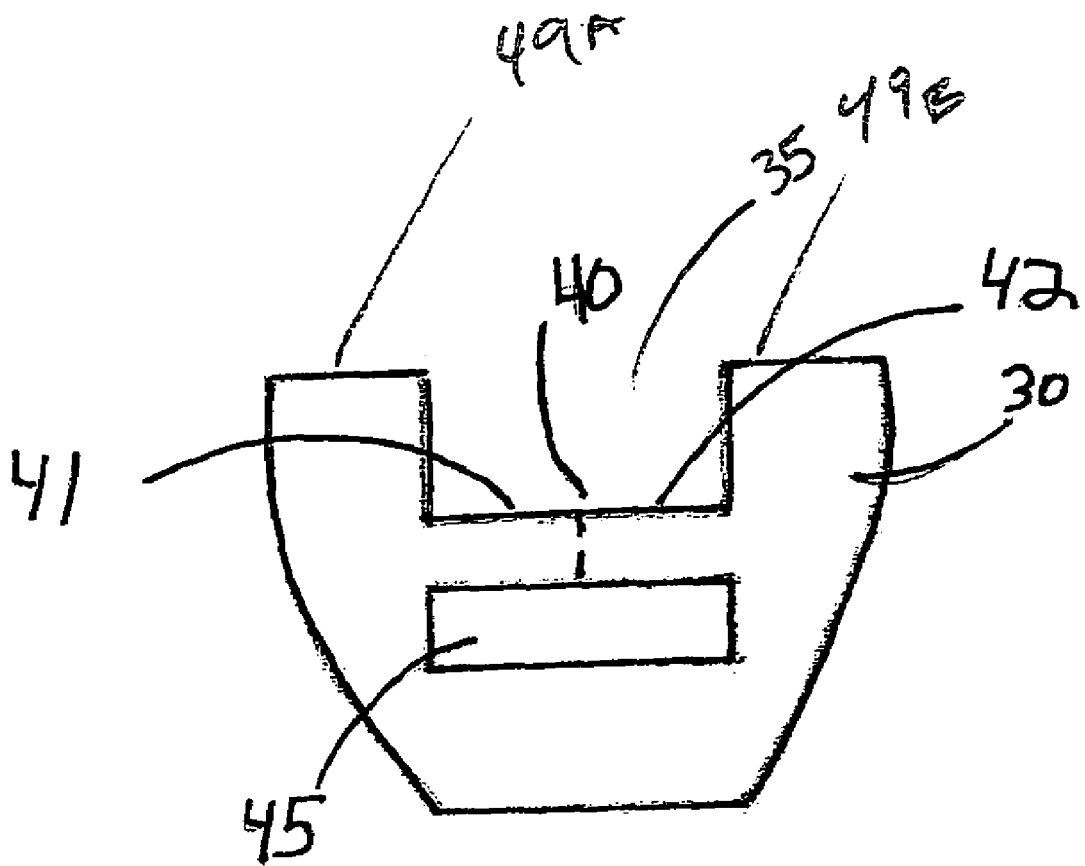
FIG. 3 is a plan view of the arch support.

FIG. 3 shows support arch 30 of support apparatus 1. Perforation 40 is located at the center of interlocking tabs 41, 42. Support arch 30 and support apparatus 1 also comprise base surface 49a and 49b which in cooperation with base surface 12 is generally flat to allow for the support of articles when support apparatus 1 is in use.

Figure 4:
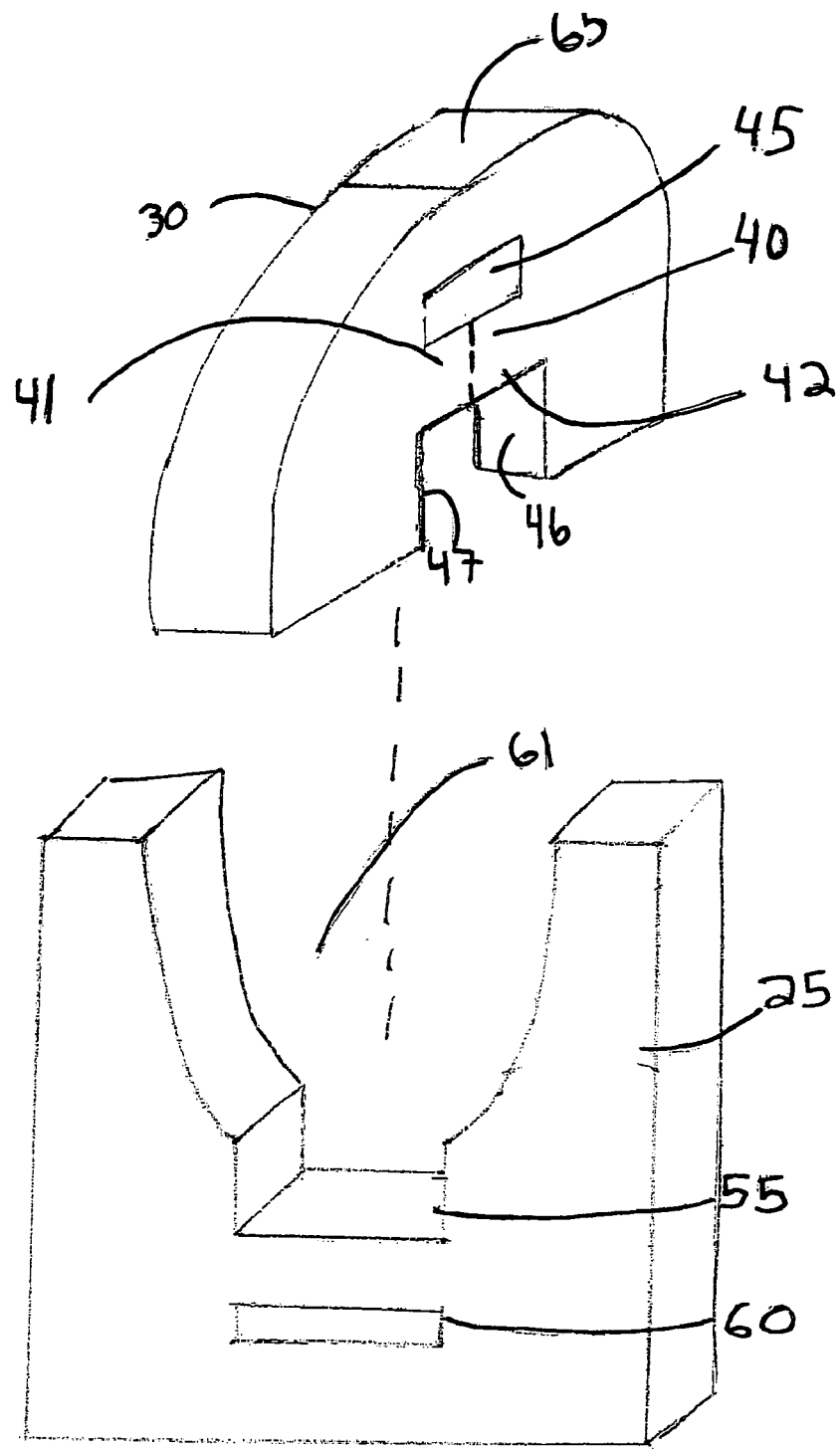
FIG. 4 is an exploded perspective view of an unassembled configuration of a preferred embodiment of the invention unassembled.

FIG. 4 shows configuration of the preferred embodiment of support apparatus 1 prior to assembly. Support arch 30 is removed from body support 25 by pressing the two pieces apart. Support arch 30 is then inverted and turned at an approximate 90 degree angle from its storage position. Between indentions 35, 45 there is a single perforation 40 in the material to allow the support arch 30 to flex under an applied stress and fit over the body support 25. Pressure is applied to support arch 30 at a location immediately below interlocking tabs 41, 42 at points 46, 47. This pressure will create a gap between the interlocking tabs 41, 42 along perforation 40 sufficient to allow connecting tabs 41, 42 to fully engage indention 60 on body support 25. Arch support 30 is lowered onto body support 25, allowing interlocking tabs 41, 42 to fully engage indention 60 located on body support 25. Once arch support 30 and body support 25 are fully engaged, depression 61 is fully formed and contained laterally by top 65 of arch support 30. Arch support 30 provides stability to support apparatus 1 in its assembly configuration by the cooperation of support arch 30 and body support 25 at a generally right angle. Indentions 45, 55, 60 serve to allow support arch 30 to be interlocked with body support 25 to provide a stable apparatus. Support arch 30 interlocks through indentions 45, 60 and provide stability to the apparatus by preventing movement between the pieces.

Figure 5:
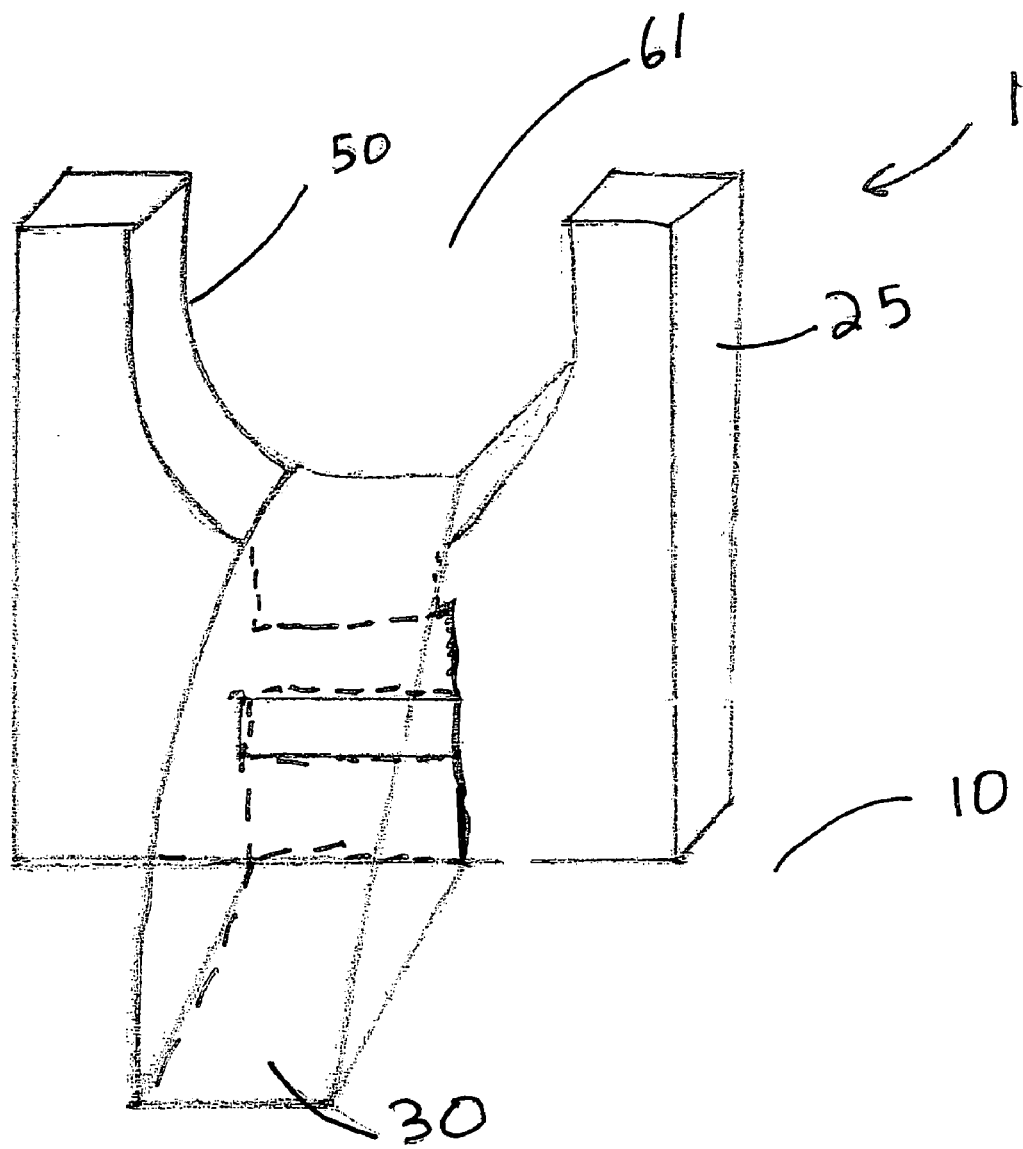
FIG. 5 is a perspective view of a preferred embodiment of the assembled configuration of the invention.

FIG. 5 shows the preferred embodiment and more specifically support arch 30 and body support 25 fully engaged as viewed from one side and somewhat above support apparatus 1. Support arch 30 is flush with the bottom of depression 61 to allow the golf bag to make full contact with side 50 of support arch 30.

Figure 6:
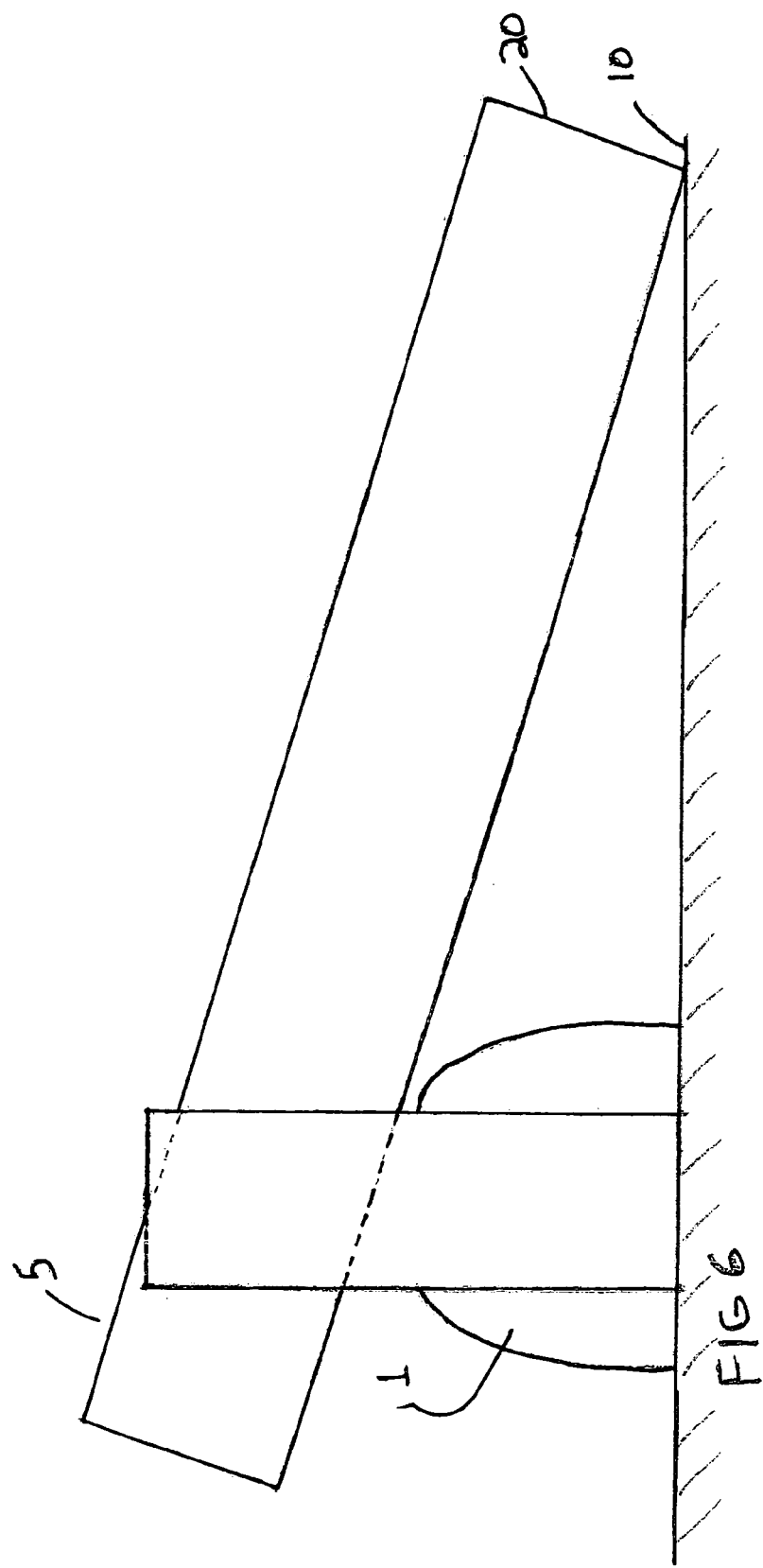
FIG. 6 is an elevation view of a golf bag mounted for transport of a preferred embodiment of the present invention.

FIG. 6 shows the support apparatus 1 in use. The support apparatus 1 is rested on a surface 10 of the transport vehicle or any other surface suitable for resting a support apparatus 1. One preferred embodiment shows golf bag 5 (or other object in need of support) resting in depression 61 of support apparatus 1 with closed end 20 of golf bag 5 resting on a surface 10 in the vehicle. Surface 10 of the vehicle can also be the trunk of a car or the bed of a truck or any space in the vehicle that provides adequate room necessary to allow golf bag 5 to be positioned on the floor or of the other surface. Support apparatus 1 can be used on surfaces other than those associated with vehicles. For instance, the floor of a clubhouse or garage for drying after an afternoon in the rain. Golf bag 5 is inclined slightly upward from base 20 of golf bag 5 and floor 10. Other items can be supported in an inclined position by the invention besides golf bag 5. Other articles that can be supported in an inclined position include other sports equipment such as hockey sticks and baseball bats.

Figure 7:
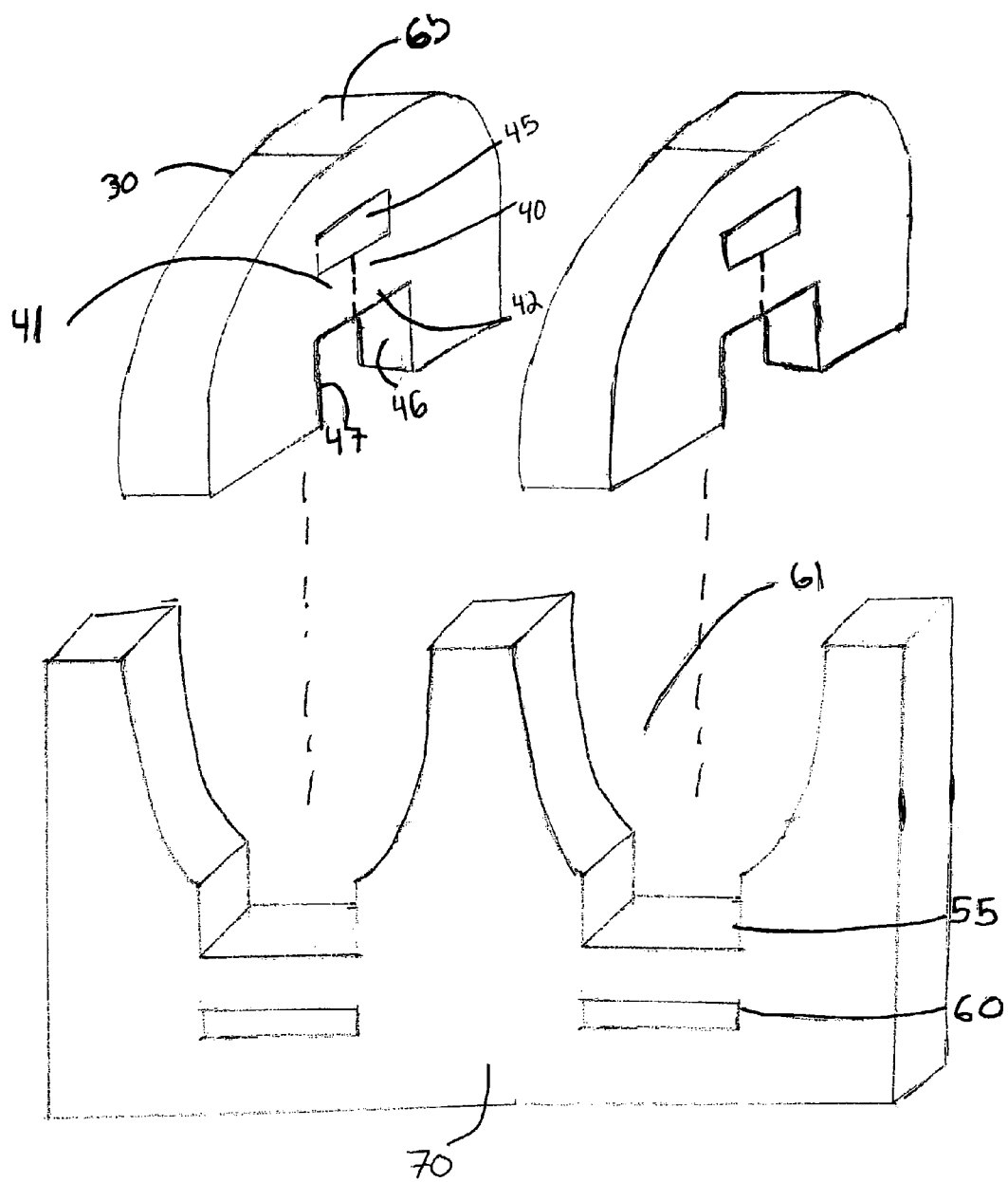
FIG. 7 is exploded perspective view of an unassembled configuration of an alternate embodiment of the invention unassembled.

FIG. 7 shows configuration of an alternate embodiment prior to assembly. Support arch 30 is removed from body support 70 by pressing the two pieces apart. Support arch 30 is then inverted and turned at an approximate 90 degree angle from its storage position. Between indentions 35, 45 there is a single perforation 40 in the material to allow the support arch 30 to flex under an applied stress and fit over the body support 70. Pressure is applied to support arch 30 at a location immediately below interlocking tabs 41, 42 at points 46, 47. This pressure will create a gap between the interlocking tabs 41, 42 along perforation 40 sufficient to allow connecting tabs 41, 42 to fully engage indention 60 on body support 70. Arch support 30 is lowered onto body support 70, allowing interlocking tabs 41, 42 to fully engage indention 60 located on body support 70. Once arch support 30 and body support 25 are fully engaged, depression 61 is fully formed and contained laterally by top 65 of arch support 30. The process is repeated until each arch support 30 is interlocked on body support 70. Arch support 30 provides stability to support apparatus 1 in its assembly configuration by the cooperation of support arch 30 and body support 70 at a generally right angle. Indentions 45, 55, 60 serve to allow support arch 30 to be interlocked with body support 70 to provide a stable apparatus. Support arch 30 interlocks through indentions 45, 60 and provide stability to the apparatus by preventing movement between the pieces.

FIG. 8 shows an alternate embodiment and more specifically support archs 30, 30 and body support 70 fully engaged as viewed from one side and somewhat above support apparatus 1. Support archs 30, 30 are flush with the bottom of depressions 61, 61 to allow the golf bag to make full contact with sides 50, 50 of support archs 30, 30.

It will be apparent to those of ordinary skill in this art and, indeed, to the general public that certain modifications and alterations, such as those stated herein, may be made in the preferred embodiments of the present invention shown and described herein without the use of inventive skill. As to all such modifications and alterations as would be obvious to such persons, it is desired that they be included within the purview of my invention, which is to be limited only by the scope, including equivalents, of the following appended claims.

The invention claimed is:

1. A support for articles comprising:
a body having a depression and a base;
an arch support capable of fitting within the depression wherein said arch support is further comprised of at least one tab and the body is further comprised of a receiving indention where the tab cooperates with the indention to secure the arch support to the body; and,
a support configuration where the arch support interlocks with the base and forms the support for articles.

2. A support for articles comprising:
a body having an arcuate depression;
an arch support capable of fitting within the arcuate depression wherein said arch support is further comprised of at least one tab and the body is further comprised of a receiving indention where the tab cooperates with the indention to secure the arch support to the body; and,
a support configuration where the arch support interlocks with the body at approximately 90 degrees and forms the support for articles.

3. A support for a golf bag comprising:
a body having an arcuate depression;
an arch support capable of fitting within the arcuate depression; and,
a support configuration where the arch support interlocks with the body and forms a support for the golf bag in the arcuate depression.

4. The support of claim 3 further comprising:
A transport configuration wherein the arch support is fitted within the arcuate depression on the body.

5. The support of claim 4 wherein said transport configuration has dimensions of 12 to 24 inches long by 8 inches wide by 2 inches thick.

6. The transport configuration as claimed in claim 4 wherein the dimensions of the transport configuration allow storage under a seat in a transport vehicle.

7. The support as described in claim 3, in which the arcuate depression has dimensions in excess of the golf bag.

8. The support of claim 3 wherein the support is made from firm yet resilient material.

9. The support of claim 8 wherein firm yet resilient material is polypropylene or polyethylene foam.

10. A support for a golf bag comprising:
a body having an arcuate depression;
an arch support capable of fitting within the arcuate depression;
wherein said arch support is further comprised of at least one tab and the body is further comprised of a receiving indention where the tab cooperates with the indention to secure the arch support to the body; and,
a support configuration where the arch support interlocks with the body and forms a support for the golf bag in the arcuate depression.

11. A support for articles comprising:
a body having at least two depressions and at least two bases;
at least two arch supports capable of fitting within the depressions wherein the at least two arch supports are further comprised of at least two tabs and the body are further comprised of at least two receiving indentions where the tabs cooperate with the indentions to secure the at least two arch supports to the body to form the support for articles.

12. A method of assembling a golf bag support including at least one base support with at least one arcuate depression and at least one arch support adapted to fit in the at least one arcuate depression comprising the steps of removing the at least one arch support from the at least one arcuate depression and inverting the at least one arch support and attaching the at least one arch support to the at least one base support.

13. A method for supporting and storing an article comprising the steps of:
a. Providing a single block of firm yet resilient material;
b. Said block further comprising at least one arch support having interlocking tabs and a body having an at least one indention and at least one depression;
c. Disassembling said block by removing arch support(s) from the depression(s) on body;
d. Inverting arch support(s) and rotating arch support(s) at a 90 degree angle and attaching arch support(s) to the body;
e. placing the assembled support apparatus on a surface; and
f. placing an article into the depression.

* * * * *